Feb. 25, 1964 S. X. BAKER ETAL 3,122,046
CABLE TERMINATION
Filed April 18, 1961 2 Sheets-Sheet 1

INVENTORS
S. X. Baker
A. A. Oakley
BY John E. Wagner
ATTORNEY

Feb. 25, 1964    S. X. BAKER ETAL    3,122,046
CABLE TERMINATION

Filed April 18, 1961    2 Sheets—Sheet 2

INVENTORS
S. X. Baker
A. A. Oakley
BY John E. Wagner
ATTORNEY 3,122,046
CABLE TERMINATION
Sidney X. Baker, Van Nuys, and Anthony A. Oakley, Woodland Hills, Calif., assignors to The Bendix Corporation, North Hollywood, Calif., a corporation of Delaware
Filed Apr. 18, 1961, Ser. No. 103,851
4 Claims. (Cl. 83—600)

This invention relates to electrical cables and more particularly to strain-relieving cable terminations.

In the installation of relatively heavy armored submarine cables, e.g. 1" or greater over-all in diameter, it is often necessary to provide a terminal for such cable which allows a degree of movement of the cable with the minimum strain due to contact between the cable and the terminal. A particularly difficult type of installation, where this is a prime problem, is the installation of submarine cables extending, for example, between a surface vessel and a submerged housing or structure which may be secured to the ocean bottom. The vessel subject to wave motion provides a varying load on the cable. It may be subject to severe bending and tensile stress as in its normal installed condition, and efforts must be made to minimize the effect of such loading on the cable to prevent its damage.

In such installations as described above the situation may also exist that the cable will be subject to such tension as to damage the submerged housing or its associated equipment, and in such case it is often more desirable to allow such excess tension to disconnect the cable or sever it rather than to damage the housing or equipment. The inconvenience of reconnecting the cable may be far less than that of attempting repair of the submerged structure. Therefore, it may be desirable to provide for an automatic cable disconnection responsive to excess cable tension above a selected value.

It is, therefore, the general object of this invention to provide a strain-relieving termination for submarine cables.

Another object of this invention is to provide such a cable termination allowing free movement of the cable relative to its terminal structure over a wide range of directions.

Another object of this invention is to provide for automatic shearing of the cable in the event of the application of excessive tension to the cable.

These objects are all achieved in accordance with this invention, one embodiment of which comprises:

A cable termination including a ball and socket joint in which the socket portion is secured to the submerged structure and the ball portion carries to a cable armor terminating block secured to the cable. Outboard from the socket portion of the terminating structure is a bell-shaped assembly with an armor terminating block positioned at the apex of the bell. The bell structure has curvilinear inner walls having a radius of curvature equal to the maximum allowable curvature on the cable.

The armor terminating block is held to the ball portion of the joint by means which are shearable when excess tension is applied to the cable. The combination also includes cutter teeth so positioned with respect to the cable and the ball member of the joint as to be forced into an unarmored section of the cable when the tension exceeds a predetermined limit, thereby severing the cable and preventing damage to the equipment.

One feature of this invention resides in the combination of a cable armor terminating block secured to a ball member of the ball and socket joint to provide a pivotal entrance for a cable into the equipment housing.

Another feature of this invention resides in the connection of the armor terminating block to the ball member by means of a pair of shear pins so that upon excess tension above a selected value in the cable armor the terminating block is freed from the ball and socket joint by severing the pins.

Another feature of this invention involves the terminating block carrying a pair of cutting teeth for the unarmored cable, so positioned so that upon shearing of the securing pins movement of the terminal block through the socket or ball member the joint causes the teeth to sever the cable.

These and other features of this invention may be more clearly understood from the following detailed description by reference to the drawing in which:

FIGS. 4a, b and c are longitudinal sectional views of this invention during cable severing operation.

Figure 1:
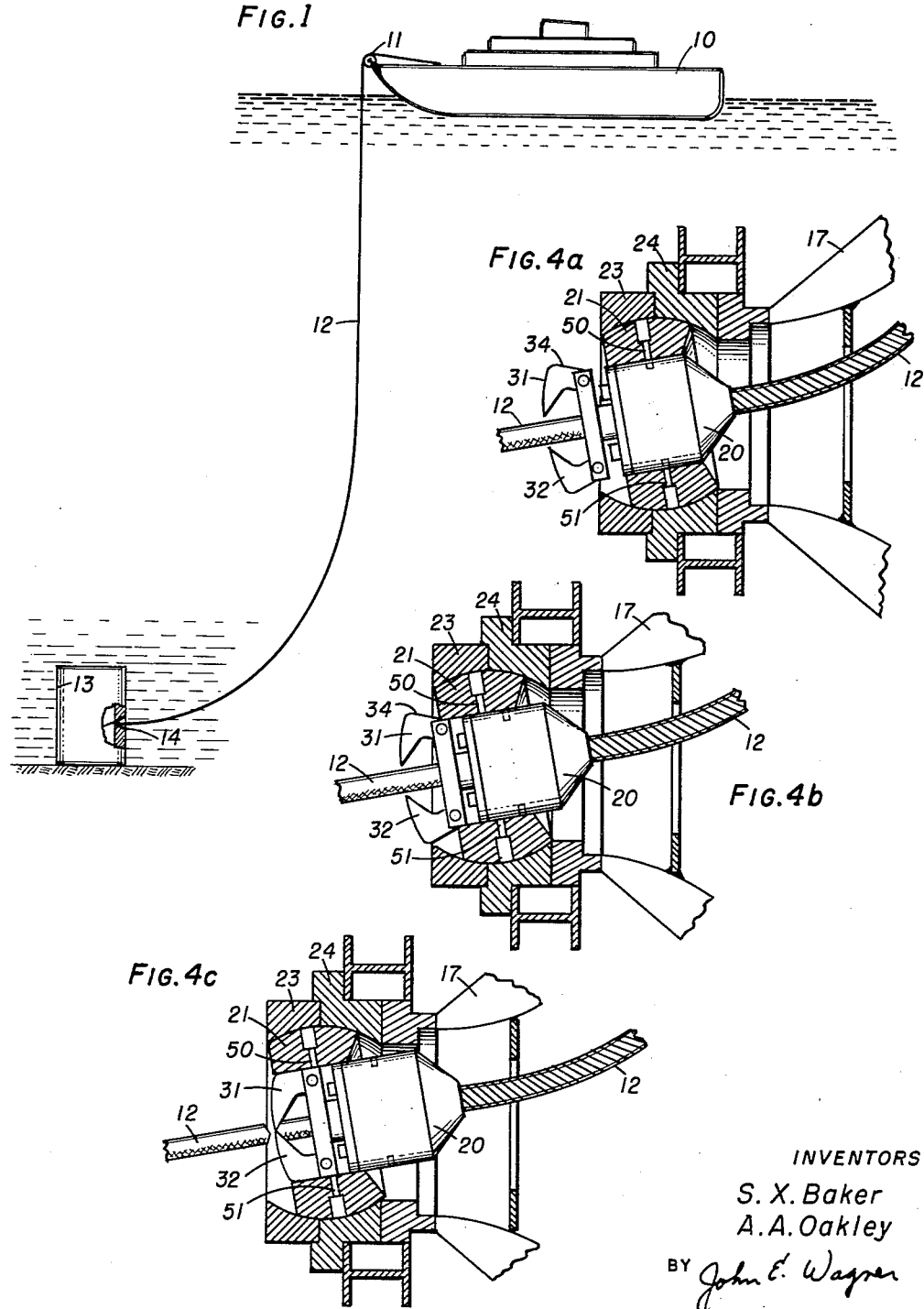
FIG. 1 is a diagram of a typical installation employing this invention.

A typical installation employing this invention is shown in FIG. 1 as including a ship 10 on the surface of the ocean carrying one end of the submarine cable 12 suspended over a sheave 11 into the water and connected to a submerged equipment housing 13. Although the ship 10 may be anchored to prevent major movement, the normal wave motion will cause variable strain on the cable 12. Local strain at the point where the cable enters the submerged housing 13 is relieved by the bell structure 14 which limits the radius of curvature of the cable 12 as it enters the housing 13.

This invention also facilitates the stress-responsive severing of the cable at any selected load. The details of this latter aspect appear in FIG. 2. There the cable 12 is shown in its intermediate position within the bell 14 extending directly into the housing without contact with the bell structure. This condition exists in the situation shown in FIG. 2.

Where the surface vessel has moved to a different position relative to the housing 13, the cable 12 may enter the housing from a more extreme angle and thereby bear against the side of the bell 14 which serves to limit the radius of curvature in the cable. Two such positions of the cable are shown in the dashed lines 12a and 12b, as well as in FIG. 4.

The bell structure 14 is made up of a series of circular rings 16 of graduated diameter supported by a series of radial rib members 17 from the housing 13. The ring structure allows the free passage of water through the bell while determining the limits of curvature of the cable in the same manner as if the structure were solid.

The cable 12 enters an armor terminating block 20 in the form of a truncated pyramid. External armor wires 15 are terminated within the block 20 in a manner hereinafter described, and the unarmored cable 12 extends into the housing 13 beyond the block 20. Within the block the armor wires are separated from the central conductors in the manner described below in connection with FIG. 3, and the cable 12, less armor, extends into the equipment housing 13 through a continuation of the axial opening through the block. The armor terminating block 20 is secured to a ring member 21 having a spherical outer surface and constituting the ball element of a ball and socket joint. The socket portions 22 of the joint, made up of a pair of rings 23 and 24, present a mating spherical surface. The socket portions 22 are secured to the equipment housing 13 at structural members 25.

Figure 2:
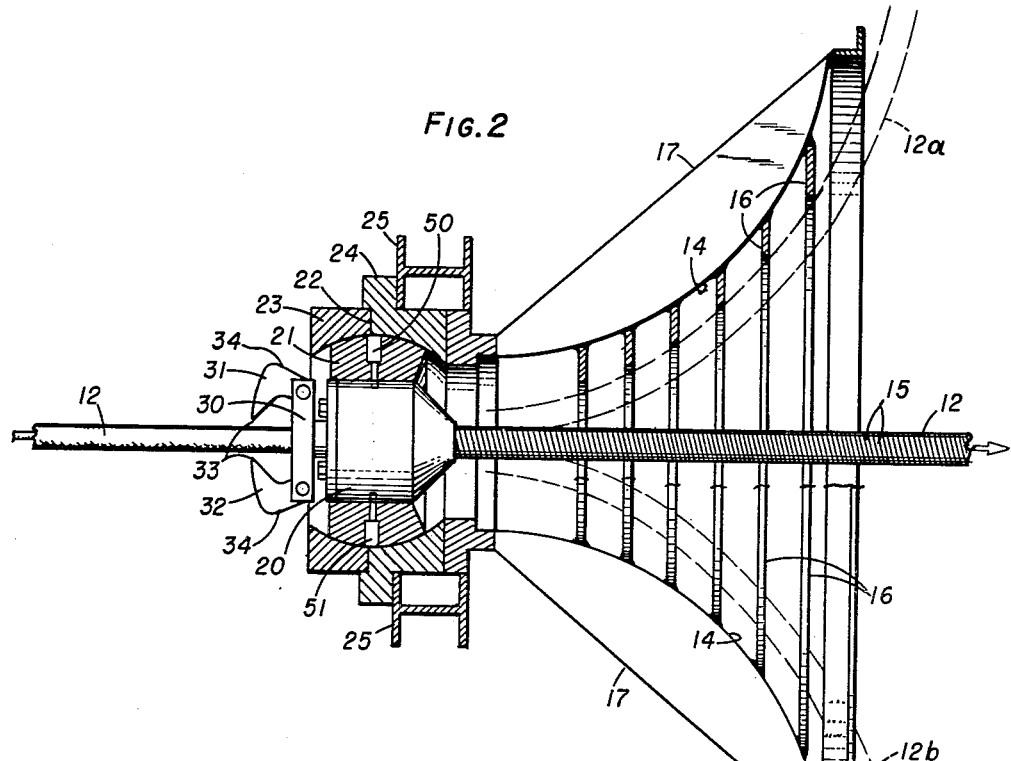
FIG. 2 is a longitudinal sectional view of a cable termination employing this invention.

Any displacement of the armored cable 12 from the central position shown to either extreme position, illustrated by the dashed lines of FIG. 2, or intermediate positions causes the block 20 and its ball member 21 to pivot in the socket 22 as shown in FIG. 4, thereby minimizing any local strain on the cable at the block 20. The block 20 includes an integral T-shaped member 30 through which the unarmored cable 12 passes with a pair of teeth 31 and 32 pivotally secured to the arms of the T 30 and having cutting surfaces 33 extending inwardly toward the axis of the block 20 and outer cam surfaces 34 extending slightly beyond the lateral extremities of the block 20. These cutting teeth 31 and 32 are directed toward the unarmored section of the cable 12 within the equipment housing 13.

Figure 3:
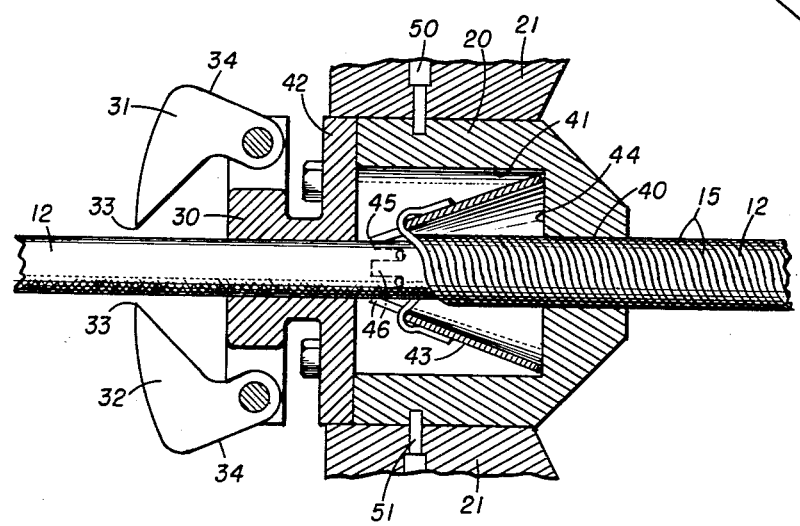
FIG. 3 is a longitudinal section of the armor terminating block of the termination of FIG. 1.

The details of the armor termination appear in FIG. 3. The block 20 includes an axial opening 40 through which the armored cable 12 passes and has a recess 41 in the rear wall closed by a flange portion 42 of the T-shaped cutter carrying member. Within the recess is a frustoconical member 43 positioned with the broader base resting against the front wall 44 of the recess and encompassing the cable 12 which passes through the restricted opening 45 in the conical member 43. Around the edge of the restricted opening 45 in the conical member are a plurality of slots 46. The armor wires 15 are terminated in the block and are flared out through the slots 46 in the conical member 43 bent back against the outer wall of the conical member 43 and secured there as by welding. With this arrangement, the strain on the cable 12 carried by the armor wires 15 is transferred to the armor terminating block 20 through the conical member 43.

The tension on the cable 12 is transferred from the block 20 to the ball member 21 of the ball and socket joint through a pair of shear pins 50 and 51 secured to the ball member 21 and extending into the block 20 in recesses in the side wall. In this manner the maximum load on the equipment structure 13 from the cable 12 is determined by the material and dimensions of the shear pins 50 and 51. In a typical application in which the maximum allowable force on the housing 13 is set at 20,000 pounds, the shear pins are of hot rolled steel, American Society for Testing Materials Type C1020, and circular of 0.51" diameter.

The cable shearing operation is illustrated in FIGS. 4a, 4b and 4c. In FIG. 4a the ball member 21 and armor terminating block 20 have pivoted in the socket, owing to movement of the cable 12 which now rests against the bell structure 14.

When the load on the cable exceeds the allowable limit determined by the shear pins 50 and 51, the pins are severed, and the armor terminating block and cable move outward from the socket. The mating surfaces of the block 20 and ball member 21 are cylindrical to allow the block 20 to slip out of the ball 21. This is illustrated in FIG. 4b.

As shown in FIG. 4c, the block 20 passes farther out of the ball member, and the cam surfaces 34 of the cutter teeth 31 and 32 come into contact with the inner cyclindrical surface of the ball member 21. The cutter teeth 31 and 32 are pivoted inwardly to allow the cutting surfaces of the teeth to enter the unarmored cable 12 and sever or weaken it to the point where it parts. The equipment shelter remains unharmed.

It may, therefore, be seen that in accordance with this invention an armor terminating structure for submarine cable allows the minimization of stress in the cable due to bending, and also allows the cable to enter a housing at any of the broad number of angles of entrance. The invention also allows the establishment of a load limit for the cable system which is controllable at will by the choice of shear pins, and one which allows the cable to be severed whenever the load is exceeded without damage to the housing or submerged equipment. In the explanation of this invention the particular problem associated with submarine application has been stressed; however, the principles of the invention may be readily applied to conventional power or communications cables as well.

In the description of this invention the shearing means is described as a pair of pivoted cutting teeth. However, it is readily apparent that the equivalent movement and action in cutting may be accomplished with a cutter mounted for linear motion through the cable; for example, actuated by a surface.

Although for the purpose of explaining the invention a particular embodiment thereof has been shown and described, obvious modifications will occur to a person skilled in the art, and we do not desire to be limited to the exact details shown and described.

We claim:

1. A termination for armored cables comprising:
   a socket member adapted to be secured to the structure at which the cable is terminated;
   a mating ball member for said socket including an axial aperture therethrough;
   means terminating the armored portion of said cable in said axial aperture;
   said terminating means secured in said aperture by at least one member shearable by tension on the armor of said cable above a selected value;
   said terminating means including cable-severing blades brought into engagement with a section of said cable beyond the terminated armor responsive to tension-produced movement of said terminating means in the axial aperture of said ball member.

2. Apparatus for terminating armored cables to a structure comprising:
   a socket member secured to the structure;
   a ball member mating with said socket member and restrained from all but rotational movement within said socket;
   said ball member including an axial aperture therethrough;
   an armor terminating block secured to the cable and positioned within the axial aperture of said ball member;
   means shearable at a predetermnied load securing said block to said ball member; a pivotally mounted cutter including a cable-severing blade portion and a cam portion, the cam portion positioned to bear against the wall of said axial aperture on movement of said block through said ball member to move the cable-severing blade portion into the cable.

3. Apparatus for terminating a submarine cable subject to varying tensional loading comprising:
   a ball and socket joint;
   means securing the socket element of said joint to the structure at which the cable is to be terminated;
   the ball element restrained by said socket element from all but rotational motion and including an axial opening therethrough;
   said cable passing through the axial opening in said ball element and into the terminating structure;
   means secured to said structure for limiting the angle of entrance of the cable into said ball member;

means shearable upon tensional load upon said cable for normally securing said cable within the axial opening in said ball element; and a cutter secured to said cable in the region within said terminating structure and having a normal transverse dimension greater than that of the axial opening in said ball; said cutter being deflectable into severing relationship with said cable upon passage through the axial opening in said ball element.

4. The combination in accordance with claim 3 wherein said cable entrance limiting means comprises a bell-shaped member positioned with said ball and socket joint at the apex of the bell.

References Cited in the file of this patent

UNITED STATES PATENTS

| | | |
|---|---|---|
| 2,452,312 | McMurray | Oct. 26, 1948 |
| 2,495,732 | Jessen | Jan. 31, 1950 |
| 2,680,005 | Storm | June 4, 1954 |

FOREIGN PATENTS

| | | |
|---|---|---|
| 16,777 | France | Feb. 6, 1913 |